United States Patent [19]

Hauk

[11] Patent Number: 4,857,284

[45] Date of Patent: Aug. 15, 1989

[54] PROCESS FOR REMOVING SULPHUR FROM THE WASTE GAS OF A REDUCTION SHAFT FURNACE

[75] Inventor: Rolf Hauk, Duesseldorf, Fed. Rep. of Germany

[73] Assignee: Korf Engineering GmbH, Duesseldorf, Fed. Rep. of Germany

[21] Appl. No.: 191,590

[22] Filed: May 10, 1988

[30] Foreign Application Priority Data

May 16, 1987 [DE] Fed. Rep. of Germany ....... 3716511

[51] Int. Cl.$^4$ ...................... C01B 17/16; C01B 31/20
[52] U.S. Cl. ..................................... 423/231; 423/244
[58] Field of Search ............... 423/231, 244, A, 244 R

[56] References Cited

U.S. PATENT DOCUMENTS 4,230,594  10/1980  Weber et al. ...................... 423/231
4,673,432   6/1987  Hauk .................................... 75/38

*Primary Examiner*—Gregory A. Heller
*Attorney, Agent, or Firm*—Barnes & Thornburg

[57] ABSTRACT

A novel process for removing the sulphur contained in a gaseous compound by absorbtion from at least part of the waste gas of a reduction shaft furnace (1) for iron ore is described. The waste gas is initially cleaned in a scrubber (13) and cooled, followed by desulphurization, during which the sulphur-absorbing material is constituted by part of the sponge iron produced in the reduction shaft furnace. Desulphurization advantageously takes place at a temperature in the range 30° to 60° C. It is preferably carried out on the $CO_2$ separated from the blast furnace gas and the blast furnace gas part used as export gas.

11 Claims, 1 Drawing Sheet

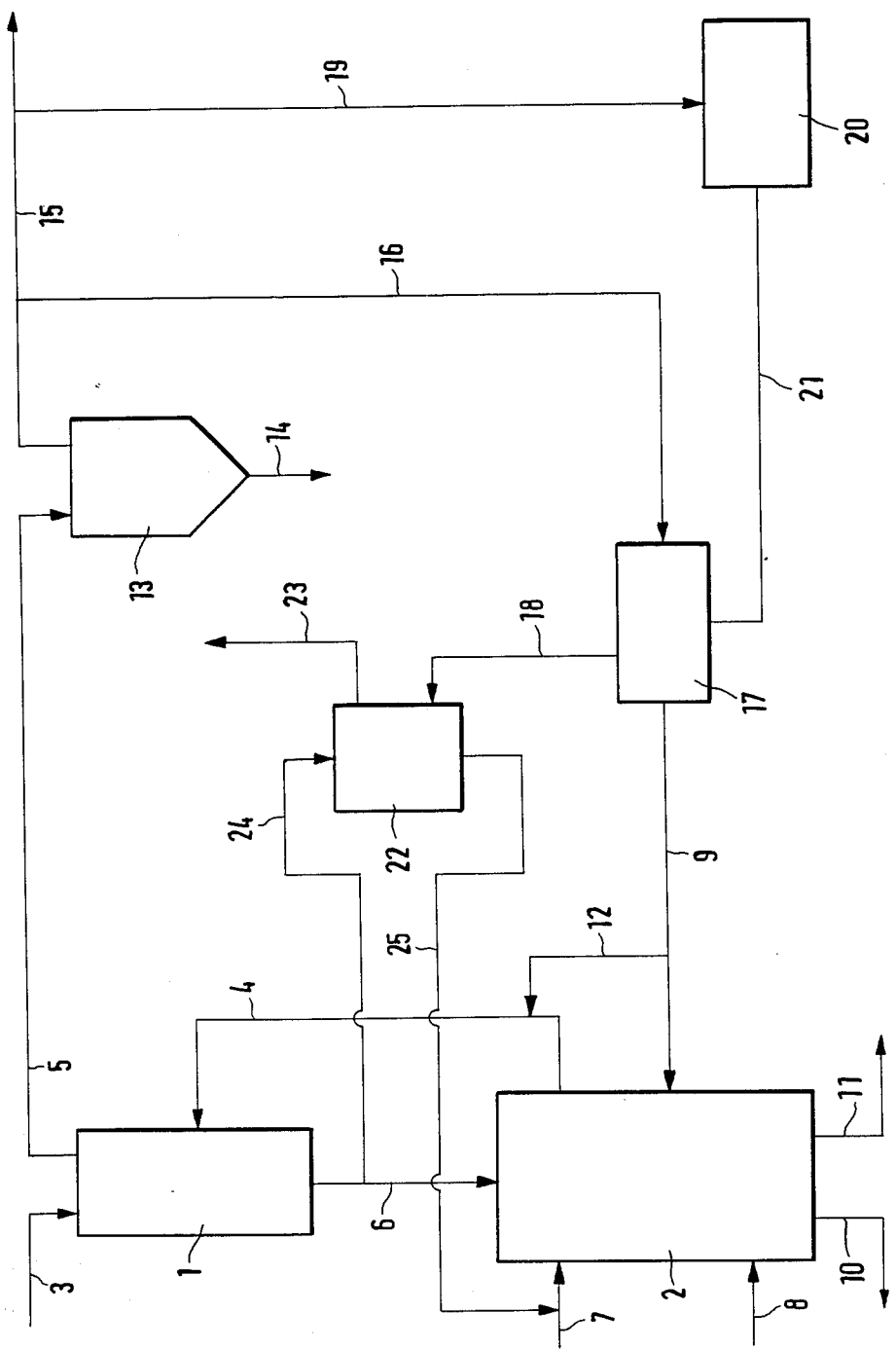

PROCESS FOR REMOVING SULPHUR FROM THE WASTE GAS OF A REDUCTION SHAFT FURNACE

The waste gas of reduction shaft furnaces is basically sulphur-containing, because the iron ore used, as well as the starting materials used for producing the reduction gas conventionally contains sulphur. The sulphur contained in the waste gas mainly occurs in the compound $H_2S$ and the concentration of this gas is generally between 50 and 100 ppm, but it is possible to pass well above or below this range, as a function of the quality of the materials used.

The waste gas of the reduction shaft furnaces is normally prepared and in part returned as reduction gas or for the recovery of reduction gas and/or is removed and used elsewhere as export gas. The sulphur compound can in particular be prejudicial in the export gas, so that it is advantageous to remove it from the export gas before the latter is used.

The waste gas is generally prepared in such a way that the solid particles are initially removed therefrom in a scrubber and it must be cooled to a temperature between approximately 30° and 60° C. The $CO_2$ contained in the waste gas is then removed, because it is prejudicial during the further use of the waste gas. Suitable processes for this are chemical washing or the so-called pressure swing process. The separated $CO_2$ contains approximately 200 ppm of $H_2S$, so that for environmental reasons it cannot be fed into the environment in this state and is also not suitable for random further processing. Thus, the sulphur compounds are conventionally removed from those parts of the waste gas, which are not returned to the reduction process as process gas. This desulphurization has hitherto been carried out with the aid of so-called Stretford washing, as well as by catalytic oxidation on activated carbon or absorbtion on luxmasse or bog iron ore. These processes are complicated and require additional materials, such as activated carbon or absorbents, which inter alia must be separately stored and disposed of.

The problem of the present invention is therefore to improve the known processes for removing the sulphur contained in at least one gaseous compound by absorbtion from at least part of the waste gas of a reduction shaft furnace for iron ore, the waste gas initially being cleaned in a scrubber and cooled and subsequently sulphur removal takes place, in such a way that the desulphurization takes place in simple manner and without using of materials exclusively required for this purpose.

A first feature of the invention is that the sulphur-absorbing material is part of the sponge iron produced in the reduction shaft furnace. This sponge iron part used for sulphur absorbtion is preferably returned to the other part of the sponge iron produced in the reduction shaft furnace. Thus, the present process is extremely simple and rational, because no additional materials are required for sulphur removal. Thus, it is possible to avoid any additional expenditure, which would otherwise be linked with the obtaining and removing of such materials.

Sulphur absorbtion is appropriately performed at a temperature in the range approximately 30° to 60° C. The lower the said temperature, the more sulphur is absorbed by the iron, i.e. the lower the concentration of the sulphur left behind in the gas.

Preferably the sponge iron produced in the reduction shaft furnace and not used for sulphur absorbtion is transferred into a melting gasifier, is melted therein and completely reduced to pig iron and the sponge iron used for sulphur absorbtion is also fed into the melting gasifier after taking up the sulphur. In the melting gasifier the sulphur is bound by fluxes introduced in the molten slag collecting over the iron bath. The slag and also the molten pig iron are tapped off at given time intervals.

BRIEF DESCRIPTION OF THE DRAWING

The invention is explained in greater detail hereinafter by means of the embodiment shown in the drawing, which is a diagrammatic representation of a plant for producing molten pig iron from iron ore.

The represented plant essentially comprises a direct reduction shaft furnace 1 and a melting gasifier 2 located beneath it. Preferably lumpy iron ore is supplied to the shaft furnace 1 in known manner by means of a pipe 3. By means of pipe 4, reduction gas is blown into the shaft furnace 1 and rises upwards counter to the flow of the downwardly sinking iron ore and brings about the reduction of the iron ore. After flowing through the shaft furnace 1 said gas is removed as blast furnace gas by means of a pipe 5.

By means of downcomers 6 the iron ore reduced to sponge iron passes into the melting gasifier 2. To the melting gasifier 2 is supplied in known manner by means of a pipe 7 a carbon carrier, e.g. in the form of high temperature carbonized coke, as well as an oxygen-containing gas by means of a pipe 8. In a manner to be described hereinafter, by means of a pipe 9 prepared blast furnace gas from shaft furnace 1 is fed into the melting gasifier 2. At given time intervals molten pig iron is removed from the melting gasifier 2 by means of a pipe 10 and molten slag is removed therefrom by means of a pipe 11.

In melting gasifier 2 is produced gas essentially comprising CO and $H_2$, which has a temperature of approximately 1000° C. and is blown by means of pipe 4 into shaft furnace 1 as reduction gas. Beforehand prepared blast furnace gas is admixed therewith by means of a pipe 12 branching from pipe 9, so that the reduction gas temperature is set to a value of approximately 850° C. which is suitable for reduction purposes.

The blast furnace gas is firstly passed by means of pipe 5 into a scrubber 13, where it is cooled to a temperature of e.g. 35° C. and in which the solid particles are separated from the blast furnace gas. They are fed by means of a pipe 14 preferably into the melting gasifier 2.

The cooled and cleaned blast furnace gas passes from scrubber 13 into a pipe 15, from which branches a pipe 16, which receives the blast furnace gas returned to the reduction process. Pipe 16 issues into a $CO_2$ scrubber 17, where in known manner the $CO_2$ is removed from the blast furnace gas. The prepared blast furnace gas is removed via pipe 9 and the $CO_2$ via pipe 18.

Further blast furnace gas from pipe 15 passes via a pipe 19 into a steam generator 20, where it is burned for steam production purposes. The steam is fed via a pipe 21 to the $CO_2$ scrubber 17, where it is required for separating the $CO_2$ from the blast furnace gas.

The process parameters are preferably set in such a way that all the blast furnace gas produced in shaft furnace 1 is required for maintaining the reduction process. This means that all the blast furnace gas flowing through pipe 15 is received by pipes 16 and 19. However, if part of the blast furnace gas is not required, it is removed as export gas for use elsewhere.

The $CO_2$ containing a $H_2S$ content of e.g. 200 ppm passes out of the $CO_2$ scrubber 17 via pipe 18 into a desulphurization reactor 22. It rises therein through a column comprising sponge iron and is led off into the open via a pipe 23 or is supplied to a further processing means.

The desulphurization reactor 22 is loaded from above via a pipe 24 with sponge iron, which is connected to the sponge iron outlet of blast furnace 1. Through corresponding conveying means, a small part of the sponge iron produced in shaft furnace 1 is continuously or discontinuously conveyed to the desulphurization reactor 22. At the bottom of desulphurization reactor 22 is provided an outlet connected to a pipe 25. In accordance with the quantities supplied via pipe 24, using pipe 25 sponge iron is removed from the desulphurization reactor 22, so that the sponge iron drops downwards in the desulphurization reactor 22 counter to the $CO_2$ flow. The sponge iron reacts with the $H_2S$ in the $CO_2$ in such a way that iron sulphide and hydrogen form. The iron sulphide is removed by means of pipe 25, so that the gas removed via pipe 23 is substantially free from sulphur.

This reaction between iron and $H_2S$ is aided by relatively low temperatures. It is therefore necessary to cool the blast furnace gas before it can be desulphurized in the described manner. At the temperature at which the blast furnace gas leaves the shaft furnace 1, such a desulphurization would only be possible at a $H_2S$ content higher than roughly 800 ppm. However, such a sulphur concentration is not normally reached in the blast furnace gas, so that the described desulphurization is only appropriate if the blast furnace gas is initially cooled, the appropriate temperature range being 30° to 60° C. The desulphurized gas then has a $H_2S$ content of less than 1 ppm.

The sulphur-containing sponge iron passes via pipe 25 into pipe 7, by means of which it is fed together with the carbon carrier into the melting gasifier 2. In the latter the sponge iron is freed from sulphur by sulphur-binding fluxes and, like the sponge iron introduced through the downcomers 6, is melted and completely reduced to pig iron. The sulphur is bound in the slag drawn off by means of pipe 11.

As a result of the lower gas quantity and the higher sulphur concentration it is appropriate, as shown in the embodiment, to only desulphurize the branched off $CO_2$ gas flow. However, through the $CO_2$ and moisture, there can be a reoxidation of the iron, which leads to a CO or $H_2$ formation with a concentration of approximately 500 ppm. Therefore it can be advantageous in certain circumstances to perform desulphurization in the blast furnace gas prior to the removal of the $CO_2$, FeO also acting as a desulphurizing agent.

Excess blast furnace gas used as export gas is appropriately also desulphurized prior to its further use. It can be passed through a separate desulphurization reactor or can be desulphurized together with the blast furnace gas returned as process gas and then branched off therefrom.

For a plant for producing 40 tonnes of pit iron per hour, in the case of a sulphur load of 50% and a $H_2S$ content of 80 ppm in the blast furnace gas, only 20 kg of sponge iron per hour is required for loading the desulphurization reactor 22. Approximately 62900 $Nm^3/h$ of blast furnace gas with a composition of approximately 37.2% CO, 32.8% $CO_2$, 12.0% $H_2S$, 12.9% $H_2O$ and some $CH_4$ and $N_2$ are produced. Of this 42850 $Nm^3/h$ are passed via pipe 16 to the $CO_2$ scrubber 17, whilst the remainder is used for producing steam in steam generator 20 and no export gas is discharged. 15350 $Nm^3/h$ of $CO_2$ are passed via pipe 18 into the desulphurization reactor 22, whilst of the remaining prepared blast furnace gas 18500 $Nm^3/h$ are fed into the melting gasifier 2 and 9000 $Nm^3/h$ via lines 12 and 4 directly into blast furnace 1 as reduction gas. By means of pipe 3 the blast furnace 1 is supplied with 60 t/h of pig iron in pellet form, as well as 3 t/h of dolomite and 5.6 t/h of limestone as fluxes. The total reduction gas quantity fed into the blast furnace is 61000 $Nm^3/h$ with a CO and $H_2$ proportion of 90%. In addition, 18.5 t/h of coal and 11700 $Nm^3/h$ of oxygen are also blown into the melting gasifier 2 for producing said reduction gas and for melting and completely reducing the sponge iron.

I claim:

1. A method for desulfurization of at least part of a waste gas produced by a reduction shaft furnace, the method comprising the steps of:
   scrubbing the waste gas to form a first stream of gas substantially free of carbon dioxide and a second stream of gas containing gaseous sulfur compounds and carbon dioxide;
   contacting the second stream of gas with a sponge iron to form a sulfur compound-containing sponge iron and a gas substantially free from sulfur compounds; and
   feeding the sulfur compound-containing sponge iron into a melting gasifier and introducing fluxes into the melting gasifier to bend the sulfur compounds in a slag produced in the melting gasifier.

2. The method of claim 1 wherein the contacting step is performed at a temperature between about 30° C. and 60° C.

3. The method of claim 2 further comprising the steps of:
   cooling the waste gas to said temperature prior to the contacting step; and
   removing any solid particles from the waste gas.

4. The method of claim 1 further comprising the step of reducing the sulfur compound-containing sponge iron in the melting gasifier to pig iron and molten slag.

5. The method of claim 1 further comprising the step of removing the slag including the bound sulfur containing compounds from the melting gasifier.

6. A method for desulfurization of at least part of a waste gas produced by a shaft furnace during the reduction of iron ore, the method comprising the steps of:
   cooling the waste gas to a temperature of between about 30° C. and 60° C.;
   removing any solid particles from the waste gas;
   scrubbing the waste gas to form a first stream of gas substantially free of carbon dioxide and a second stream of gas containing gaseous sulfur compounds and carbon dioxide;
   contacting the second stream of gas with a sponge iron produced in the reduction shaft furnace to form a sulfur compound-containing sponge iron and a gas substantially free from sulfur compounds;
   feeding the sulfur compound-containing sponge iron into a melting gasifier;
   reducing the sulfur compound-containing sponge iron in the melting gasifier to pig iron and molten slag; and introducing fluxes into the melting gasifier to bind the sulfur compounds in the slag.

7. The method of claim 6 further comprising the step of removing the slag including the sulfur containing compounds from the melting gasifier.

8. The method of claim 6 further comprising the step of introducing at least part of said first stream of gas into the melting gasifier.

9. The method of claim 8 further comprising the steps of:
mixing at least part of said first stream of gas with a stream of reduction gas exiting the melting gasifier; and
introducing the mixed gas into the reduction shaft furnace.

10. The method of claim 9 wherein the mixing step is conducted in such a ratio of gases that the mixed gas introduced into the reduction shaft furnace has a temperature of about 850° C.

11. A method for desulfurization of at least past of a waste gas produced in a process for producing pig iron from iron ore the method comprising the steps of:

cooling the waste gas to a temperature of between about 30° C. and 60° C.;
removing any solid particles from the waste gas;
scrubbing the waste gas to form a first stream of gas substantially free of carbon dioxide and a second stream of gas containing gaseous sulfur compounds and carbon dioxide;
contacting the second stream of gas with a portion of the sponge iron produced in the reduction shaft furnace to form a sulfur compound-containing sponge iron and a gas substantially free from sulfur compounds;
feeding the sulfur compound-containing sponge iron into the melting gasifier with a carbon carrier;
reducing the sulfur compound-containing sponge iron in the melting gasifier to molten pig iron and slag;
introducing fluxes into the melting gasifier to bind the sulfur compounds in the slag; and
removing the slag including the sulfur containing compounds from the melting gasifier.

* * * * *